W. LYNN.
HINGE.
APPLICATION FILED MAY 10, 1915.
1,176,765. Patented Mar. 28, 1916.
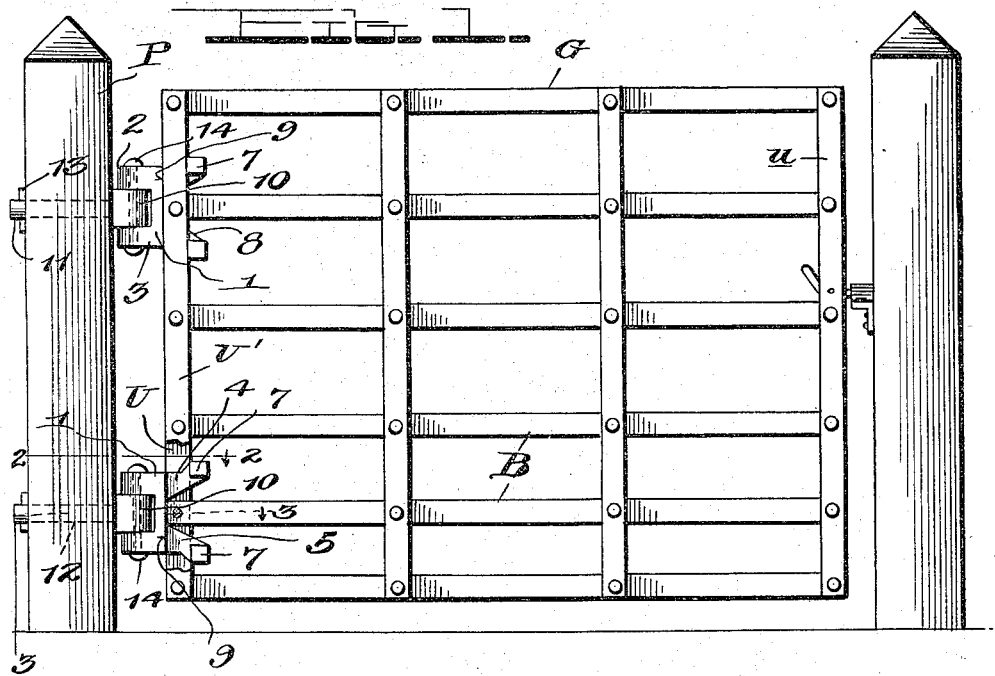
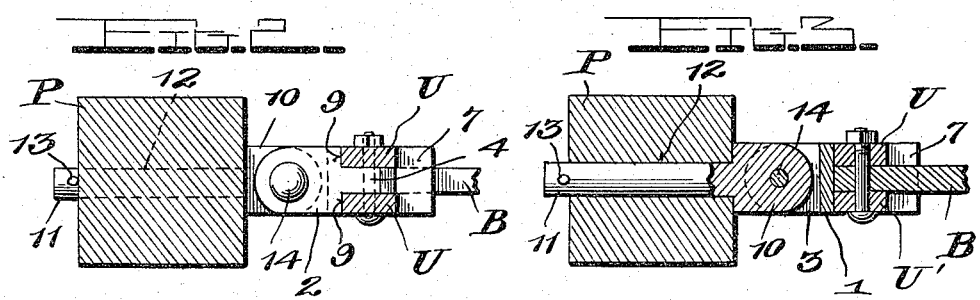
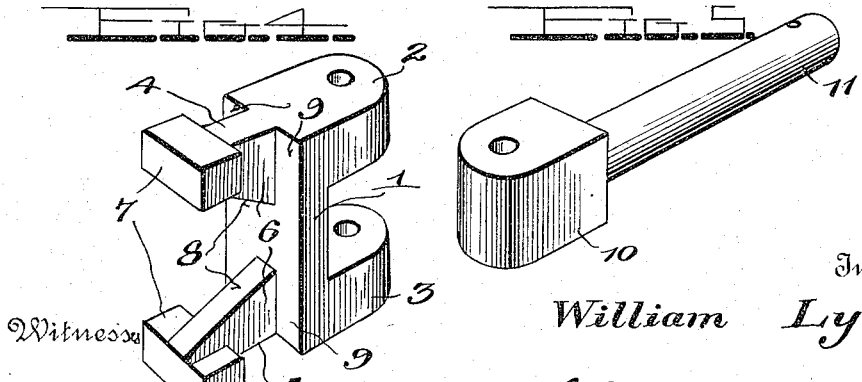
Witness
Chas. L. Grieshauer.
Inventor
William Lynn,
by H. B. Willson & Co.
Attorneys

UNITED STATES PATENT OFFICE.

WILLIAM LYNN, OF BLOOMFIELD, INDIANA.

HINGE.

1,176,765.  Specification of Letters Patent.  Patented Mar. 28, 1916.

Application filed May 10, 1915. Serial No. 27,151.

*To all whom it may concern:*

Be it known that I, WILLIAM LYNN, a citizen of the United States, residing at Bloomfield, in the county of Greene and State of Indiana, have invented certain new and useful Improvements in Hinges; and I do declare the following to be a full, clear, and exact description of the invention, such as will enable others skilled in the art to which it appertains to make and use the same.

This invention relates to improvements in hinges and more particularly to hinges for gates which are designed to be raised and lowered.

The object of the invention is to provide a hinge of this character which, while very simple in construction, is strong and efficient in operation, being composed of two parts only.

With this and other objects in view, the invention consists of certain novel features of construction, and the combination and arrangement of parts as will be more fully described and claimed.

In the accompanying drawings:—Figure 1 represents a side elevation of a gate equipped with this improved hinge; Fig. 2 is a horizontal section taken on the line 2—2 of Fig. 1, looking in the direction of the arrow; Fig. 3 is a similar view taken on the line 3—3 of Fig. 1; Fig. 4 is a detail perspective view of one member of the hinge; Fig. 5 is a similar view of the other member.

The improved hinge contemplated by the present invention is shown mounted on a gate G supported by a post P and this gate as shown comprises vertically spaced cross bars B with their rear ends arranged between laterally spaced uprights U and U', the front and intermediate portions of said cross bars being suitably supported by uprights *u* or by any other suitable means. This improved hinge comprises a casting 1 having laterally extending vertically spaced knuckles 2 and 3 on one face thereof, and laterally extending gate engaging clamping arms 4 and 5 on its opposite face. These arms are also vertically spaced and as shown are in the form of T-shaped members, the shanks 6 of which are made integral with the casting 1 and have their inner edges inclined upwardly and inwardly from the outer faces of the heads 7 thereof toward the casting 1 as shown at 8, thus providing between said arms a substantially truncated V-shaped space to provide for the insertion between them of one of the cross bars B of the gate, and to permit the gate to be raised and lowered relatively to these arms, the diverging or inclined faces of which provide for this movement. Shoulders 9 are formed on the casting 1 at the bases of the shanks 6 of the arms 4 and 5 on opposite sides thereof and are designed to engage the rear edges of the uprights U and U' of the gate G when the parts are assembled as is shown clearly in Fig. 2. The inner faces of the heads 7 of the arms 4 and 5 are spaced from the shoulders 9 a distance equal to the width of the uprights U and U' of the gate G to which the hinge is to be applied so that when said arms are inserted between said uprights the opposite ends of the heads 7 will overlap the inner edges of the uprights U and U' and thereby securely clamp said uprights between said heads 7 and shoulders 9 of the casting 1. When these members 1 are applied to the gate as shown in Fig. 1 with one of the cross bars B disposed between the arms 4 and 5, they will be held reliably in position relative to the gate by the engagement of the bases of the arms with said cross bars and by the clamping of the uprights between the heads and shoulders of said member.

The post carried member of this hinge comprises a knuckle 10 which is adapted to be inserted between the knuckles 2 and 3 of the gate carried member 1 and has a shank 11 extending laterally and rearwardly from said knuckles which is designed to be extended through a transversely formed bore 12 of the post P, and to have its free end project beyond the rear face of said post and secured in operative position by any suitable means, a pin 13 being here shown for this purpose.

From the above description it will be obvious that while this gate hinge is composed of two parts only, it is very stong and durable in construction and will firmly and reliably clamp and support the gate with which it is connected, and the diverging edges 8 of the arms 4 and 5 thereof will provide for the raising and lowering of the gate a distance equal to the space between said inclined or diverging arm faces.

The knuckles 2 and 3 of the gate carried member 1 and the knuckle 10 of the post member, are connected in the usual manner by a pintle 14.

While one hinge only has been described it is obvious that two or more are designed to be employed for supporting a gate, all being exactly alike, although one only is described in detail.

I claim as my invention:—

1. A hinge comprising a casting having rearwardly extending vertically spaced knuckles on one face thereof and laterally extending vertically spaced headed arms on its opposite face, the inner or opposed faces of said arms diverging from each other, the heads of said arms extending beyond opposite sides thereto to form gate engaging shoulders, and shoulders formed on the casting at the base of said arms.

2. A hinge comprising a casting having rearwardly extending vertically spaced knuckles on one face thereof, T-shaped arms on its opposite face, the inner edges of the shanks of said arms being inclined inwardly and upwardly from their heads toward said casting, and shoulders on said casting at opposite sides of said arms.

In testimony whereof I have hereunto set my hand in presence of two subscribing witnesses.

WILLIAM LYNN.

Witnesses:
GERTRUDE B. LYNN,
LULA RICHESON.

Copies of this patent may be obtained for five cents each, by addressing the "Commissioner of Patents, Washington, D. C."